US012547793B2

(12) United States Patent
Padmanabhan et al.

(10) Patent No.: US 12,547,793 B2
(45) Date of Patent: Feb. 10, 2026

(54) DIGITAL TWIN SIMULATION BASED COMPLIANCE OPTIMIZATION

(71) Applicant: International Business Machines Corporation, Armonk, NY (US)

(72) Inventors: Girish Padmanabhan, Pune (IN); Sarbajit K. Rakshit, Kolkata (IN); Venkata Vara Prasad Karri, Visakhapatnam (IN); Arvind Agarwal, New Delhi (IN); Harshit Kumar, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 17/454,335

(22) Filed: Nov. 10, 2021

(65) Prior Publication Data

US 2023/0140909 A1    May 11, 2023

(51) Int. Cl.
*G06F 30/20* (2020.01)
*G06Q 30/018* (2023.01)

(52) U.S. Cl.
CPC .......... *G06F 30/20* (2020.01); *G06Q 30/018* (2013.01)

(58) Field of Classification Search
CPC .............................. G06F 30/20; G06Q 30/018
USPC ........................................................... 703/6
See application file for complete search history.

(56) References Cited

FOREIGN PATENT DOCUMENTS

| CN | 111093054 A | 5/2020 | |
|---|---|---|---|
| KR | 102190121 B1 | 12/2020 | |
| WO | WO-2019211288 A1 * | 11/2019 | |
| WO | 2020056677 A1 | 3/2020 | |
| WO | WO-2022056152 A1 * | 3/2022 | ......... G01N 21/3504 |

OTHER PUBLICATIONS

"How Digital Distance Management Can Ensure the Resumption of Operations", Downloaded May 6, 2021, 7 pages, <https://www.rfidjournal.com/how-digital-distance-management-can-ensure-the-resumption-of-operations>.

Boje et al., "Towards a semantic Construction Digital Twin: Directions for future research", Accepted Mar. 10, 2020, 16 pages, <https://www.researchgate.net/publication/340234659_>.

Disclosed Anonymously, "Contamination Spread Management in Smart Cities", An IP.com Prior Art Database Technical Disclosure, IP.com No. IPCOM000265038D, IP.com Electronic Publication Date: Feb. 20, 2021, 6 pages.

(Continued)

*Primary Examiner* — Brian S Cook
(74) *Attorney, Agent, or Firm* — Michael A. Petrocelli

(57) ABSTRACT

Embodiments of the present invention provide methods, computer program products, and systems. Embodiments of the present invention can in response to receiving information associated with an activity, identify requirements associated with performance of the activity. Embodiments of the present invention can then determine relevancy of each requirement of the identified requirements. Embodiments of the present invention can then define compliance mechanisms needed to verify compliance of the identified requirements that were determined relevant, and in response to detecting a violation, execute one or more remedial actions to satisfy an identified requirement that was determined relevant of the identified requirements.

14 Claims, 6 Drawing Sheets

(56) References Cited

OTHER PUBLICATIONS

Disclosed Anonymously, "Method and System for the Level of Precaution Compliance State Validation in Any Contaminated Area", An IP.com Prior Art Database Technical Disclosure, IP.com No. IPCOM000264390D, IP.com Electronic Publication Date: Dec. 10, 2020, 6 pages.

Liu et al., "Digital Twin-based Safety Evaluation of Prestressed Steel Structure", Advances in Civil Engineering, vol. 2020, Article ID 8888876, Published Sep. 4, 2020, 10 pages, <https://downloads.hindawi.com/journals/ace/2020/8888876.pdf>.

\* cited by examiner

DIGITAL TWIN SIMULATION BASED COMPLIANCE OPTIMIZATION

BACKGROUND

The present invention relates in general to compliance enforcement and in particular to predicting compliance violations using digital twin simulation.

A digital twin is a digital replica of a living or non-living physical entity. In general, a digital twin refers to a digital replica of potential and actual physical assets (physical twin), processes, people, places, systems and devices that can be used for various purposes. The digital representation provides both the elements and the dynamics of how an Internet of things device operates and lives throughout its life cycle.

Digital twins have two main characteristics: a connecting between the physical model and the corresponding virtual model or counterpart, and that this connection is established by generating real-time data using sensors. In general, digital twins integrate IoT, artificial intelligence, machine learning and software analytics with spatial network graphs to create living digital simulation models that update and change as their physical counterparts change. A digital twin continuously learns and updates itself from multiple sources to represent its near real-time status, working condition or position. This learning system learns from itself, using sensor data that conveys various aspects of its operating condition, from human experts, such as engineers with deep and relevant industry domain knowledge, from other similar machines, from other similar fleets of machines, and from the larger systems and environment of which it may be a part. A digital twin also integrates historical data from past machine usage to factor into its digital model.

A smart contract typically refers to a computer program or a transaction protocol which is intended to automatically execute, control or document legally relevant events and actions according to the terms of a contract or an agreement. Smart contracts can also refer to general purpose computation that takes place on a blockchain or distributed ledger, that is, a collection of code and data (sometimes referred to as functions and state), that is deployed using cryptographically signed transactions on the blockchain network". A smart contract also can be regarded as a secured stored procedure as its execution and codified effects like the transfer of some value between parties are strictly enforced and cannot be manipulated, after a transaction with specific contract details is stored into a blockchain or distributed ledger.

SUMMARY

According to an aspect of the present invention, there is provided a computer-implemented method. The computer implemented method comprises: in response to receiving information associated with an activity, identifying requirements associated with performance of the activity; determining relevancy of each requirement of the identified requirements; defining compliance mechanisms needed to verify compliance of the identified requirements that were determined relevant; and in response to detecting a violation, executing one or more remedial actions to satisfy an identified requirement that was determined relevant of the identified requirements.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize problems currently experienced with compliance and enforcement management. Current technologies rely heavily on expert knowledge to identify required obligations and requirements. This can be time consuming and costly. Existing solutions for automation of compliance and enforcement cannot predict violations and take remedial actions to prevent a violation. Embodiments of the present invention provide solutions for automated compliance by detecting violations in real time and taking one or more remedial actions for one or more systems to satisfy compliance requirements as discussed in greater detail later in this Specification. For example, some embodiments of the present invention improve compliance automation by determining relevancy of received information to compliance clauses, detecting violations based on the received information, and executing remedial actions to bring one or more systems into compliance.

Figure 1:
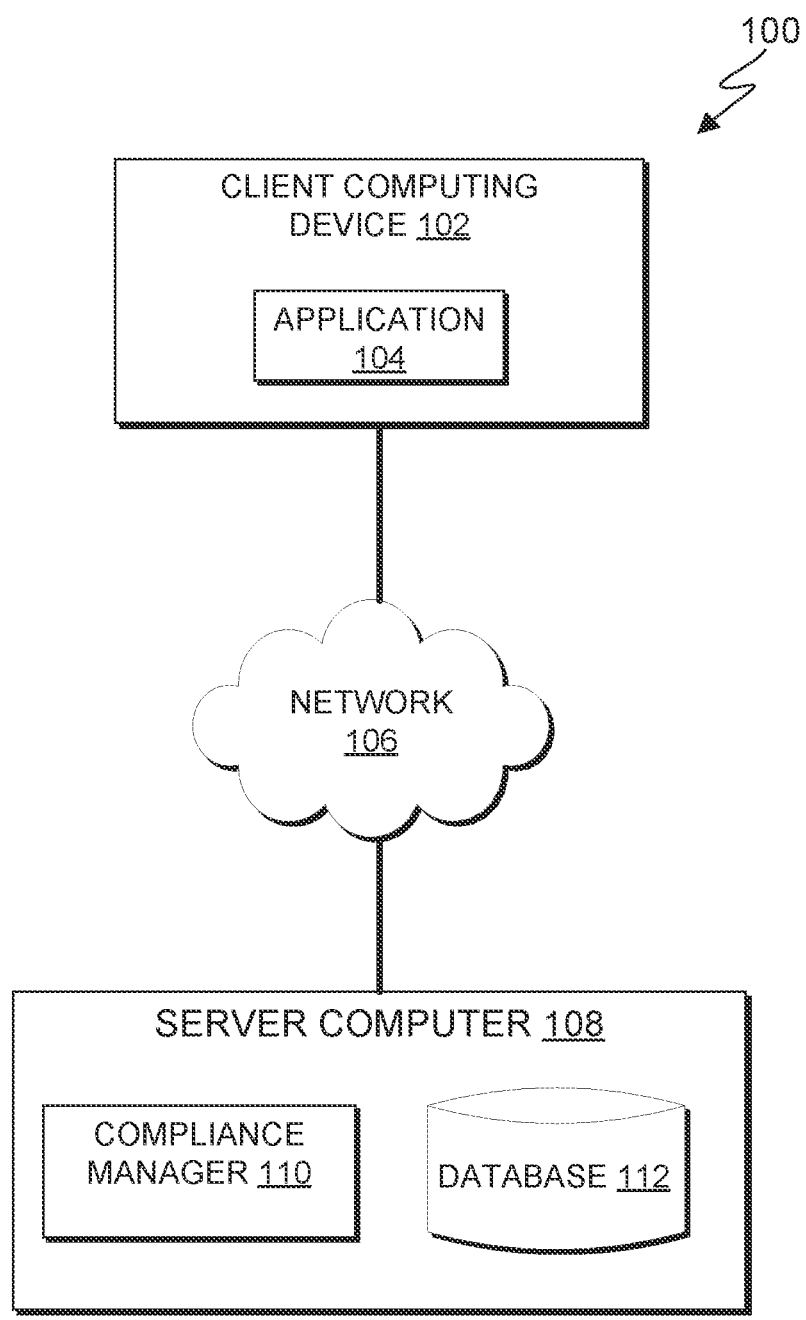
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access compliance manager 110 (e.g., using TCP/IP) to access content, user information, and database information. Application 104 can further communicate with compliance manager 110 to transmit instructions to dynamically adjust environment displays such that each user can see what is being edited by other users in a seamless manner as discussed in greater detail with regard to FIGS. 2-6.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts compliance manager 110 and database 112. In this embodiment, compliance manager 110 resides on server computer 108. In other embodiments, compliance manager 110 can have an instance of the program (not shown) stored locally on client computer device 102. In other embodiments, compliance manager 110 can be a standalone program or system that improves collaboration systems by identifying relevant information, creating optimal sensor placement to receive relevant information, and automatically detect violations. In yet other embodiments, compliance manager 110 can be stored on any number or computing devices.

Compliance manager 110 improves automated collaboration tools. For example, compliance manager 110 can improve capabilities of existing collaboration tools (e.g., smart contracts, regulatory compliance, etc.) by identifying relevant information that pertains to compliance clauses, generating a comprehensive list of relevant compliance clauses, identifying an optimal list of sensors and optimizing their respective placement to monitor compliance, and automatically detecting violations based on received information from the sensors.

A compliance clause, as used herein, refers to a requirement specified in an agreement between two parties. A compliance clause can also refer to one or more regulatory requirements. Compliance clauses may be operational or non-operational. Operational requirements refer to one or more statements that identify the essential capabilities, associated requirements, performance measures, and the process or series of actions to be taken in effecting the results that are desired in order to address mission area deficiencies, evolving applications or threats, emerging technologies, or system cost improvements. An example of an operational compliance clause might include that all construction workers must wear safety helmets while on a construction site. Another example could include that construction equipment cannot be on public roads one hour before and after a school opens or closes. Conversely non-operational requirements refer to requirements that specify criteria that can be used to judge the operation of a system (e.g., system quality and software quality requirements, that is, requirements that describe operational qualities rather than a behavior of the product), rather than specific behaviors.

Compliance manager 110 can, given an activity and description, identify associated actions that need to be performed to complete the activity, identify a list of compliance clauses (e.g., requirements), identify and recommend sensors to monitor and maintain compliance, and proactively detect potential compliance violations. An activity may refer to one or more actions that a respective user or system performs. For example, an activity can refer to a performance of a task across one or more industries (e.g., computer processing tasks, service level agreements, etc.) In some instances, an activity can also include relevant information can refer to relevant regulatory documentation, registration document, and other regulatory requirements (e.g., statutory compliance, industry specific guidelines, consumer protection regulations, etc.). Examples of regulatory compliance can include traffic laws (e.g., trucks are not allowed from a certain road, heavy vehicles are not allowed during school hours, etc.), governing bodies (e.g., cranes are not allowed to be operated because of potential hazards, sidewalks need to be protected, cranes cannot operate in an open area, trucks cannot spill hazardous materials on the road, etc.), and construction (e.g., all workers must wear safety equipment, construction material should be covered to reduce dust and pollution, construction site safety and security, etc.). An activity can also include a description. A description can include location information of an area or an event. Location information can include one or more, textual, pictorial, audio, and video files associated with either a location or an event. Location information can also include hours of operation of a building, road closures, anticipated traffic based on scheduled events such as concerts, real-time traffic, etc.

In response to receiving information, compliance manager 110 can determine additional relevant information may be required and accordingly access information associated with the activity. For example, compliance manager 110 may access public databases to identify relevant regulatory documentation, registration documents, and other regulatory requirements. For example, compliance manager 110 may receive an activity classed as home construction, compliance manager could also identify activities associated with home construction as: heavy traffic movement, hazardous material usage, water requirements, heavy machinery requirements, construction material requirements. Compliance manager 110 can then parse and extract clauses and subsequently store those clauses in a repository (e.g., database 112).

Compliance manager 110 can then identify relevance associated with the identified information using a combination of text similarity, deep learning algorithms, and entity matching as discussed in greater detail with respect to FIGS. 2-5. In some instances, compliance manager 110 may submit a request for confirmation (e.g., via a subject matter expert). Subsequently, compliance manager 110 can classify the relevant clauses as operational or nonoperational clauses. Compliance manager 110 can then covert relevant clauses into a logical form to build a list of relevant clauses (e.g., compliance manager 110 converts "water level must be greater than 100 L" to "water tank>100"). In this way, compliance manager 110 can build a list of compliance clauses for a given activity. Compliance manager 110 can then retrieve sensor information pertaining to the activity (e.g., noise sensors, motion sensors, light sensors, camera, etc.).

Compliance manager 110 can then, in instances where available sensors (i.e., existing sensors) are made known to compliance manager 110, compliance manager 110 can optimize sensor location based on the relevant information and monitor for compliance. For example, compliance manager 110 can suggest alternate locations based on contextual information (e.g., intermittent transmission as opposed to constant transmission, possible accelerated wear based on placement, incomplete readings, etc.). In instances where sensor availability is unknown or otherwise unavailable, compliance manager 110 can determine optimal sensor placement based on requirements that need to be satisfied. For example, where flow rate of a liquid is a requirement, compliance manager 110 can suggest sensor placement at the opening and exit of a liquid carrying device (e.g., at either end of tube carrying liquid).

In this embodiment, compliance manager 110 builds a digital twin to monitor the activity and simulate detected activities or actions that can affect compliance. For example, for each identified relevant clause (e.g., heavy vehicles are not allowed in an area during school hours, workers must wear safety equipment, etc.), compliance manager 110 can build a digital twin of the environment in which the activity will occur and monitor the activity based on the optimized sensors (e.g., sensor placement).

For example, compliance manager 110 can receive an activity defined as a transport for goods. Compliance manager 110 can identify associated actions (e.g., transport of goods, routes for the good, current location of the transport vehicle, etc.) and identify relevant compliance clauses. Compliance manager 110 can then build a digital twin simulation of the activity, actions associated with the activity and monitor compliance clauses as it receives sensor information. Compliance manager 110 can then either predict a potential violation (e.g., proactive violation detection) using the digital twin and generate warnings and recommendations before an event (i.e., a potential violation) occurs). In another embodiment, compliance manager 110 can contextualize a potential violation. Put another way, compliance manager 110 can receive a notification of a violation and simulate sensor information to predict other outcomes of the violation. For example, in an event that leads to a violation (e.g., an environment clause), compliance manager 110 can access wind speed and weather information to predict the affects of the violation (e.g., a chemical spill).

In an example, compliance manager 110 actively receives sensor updates and has detected that the current route the transport vehicle is taking places the transport vehicle in the pathway of gas leakage. Compliance manager 110 can then identify that a compliance clause prohibits transport of those goods through contaminated areas. Compliance manager 110 can then build a digital twin and simulate the activity and detected actions affecting compliance (e.g., simulate the gas leak, simulate when the transport vehicle would intersect or otherwise drive through the affected area, and identify possible outcomes based on that action). In this instance, compliance manager 110 can then generate a notification for the transport vehicle (as well as other transport vehicle in the area) and relevant parties and automatically alter the route for the transport vehicle to avoid the potential violation of the compliance clauses. Compliance manager 110 can also proactively flag and identify other transport vehicles (e.g., uncovered transport vehicles that have potential for being exposed to the gas) that are within an area affected by the gas leak.

In another example involving construction, compliance manager 110 can identify a local ordinance that specifically commercial traffic is prohibited around the time schools are over and that the construction company utilizing compliance manager 110 currently has a construction site within the radius of the school zone. In this example, compliance manager 110 can build a digital twin of the activity and relevant factors affecting the activity. From there, compliance manager 110 can proactively detect whether a construction vehicle of that company will arrive at the site within the radius of the school zone specified by the local ordinance. Accordingly, compliance manager 110 can then generate one or more recommendations to remedy the potential violation and subsequently execute one or more of the one or more generated recommendations.

In yet another example, compliance manager 110 can be used to proactively detect potential compliance issues stemming from regulatory requirements using either sensor information received in real time or using the built digital twin to simulate a period of time (e.g., to simulate potential leakage after five years). For example, compliance manager 110 can detect a potential violation (e.g., a gas leak) and generate one or more recommendations and subsequently execute at least one of the generated one or more recommendations. More specifically, in this example where compliance manager 110 has detected a gas leak, compliance manager 110 can simulate outcomes of the gas leak and identify outcomes that can happen if left untreated. Compliance manager 110 can then predict what additional compliance may be needed and one or more actions needed to be taken to fix the effects of the detected gas leak. For example, compliance manager 110 can recommend that the town exposed to the potential gas leak would need to apply an additional layer of filter to remove possible traces of the gas to ensure compliance. Compliance manager 110 can also recommend that restaurants within a certain radius of the gas leak provide only aerated water to avoid possible contamination and that schools within the radius, should install air purifiers and monitor air quality. In other words, compliance manager 110 can generate one or more recommendations that would ensure compliance with a requirement.

Database 112 stores received information and can be representative of one or more databases that give permissioned access to compliance manager 110 or publicly available databases. For example, database 112 can store environment information associated with the user. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
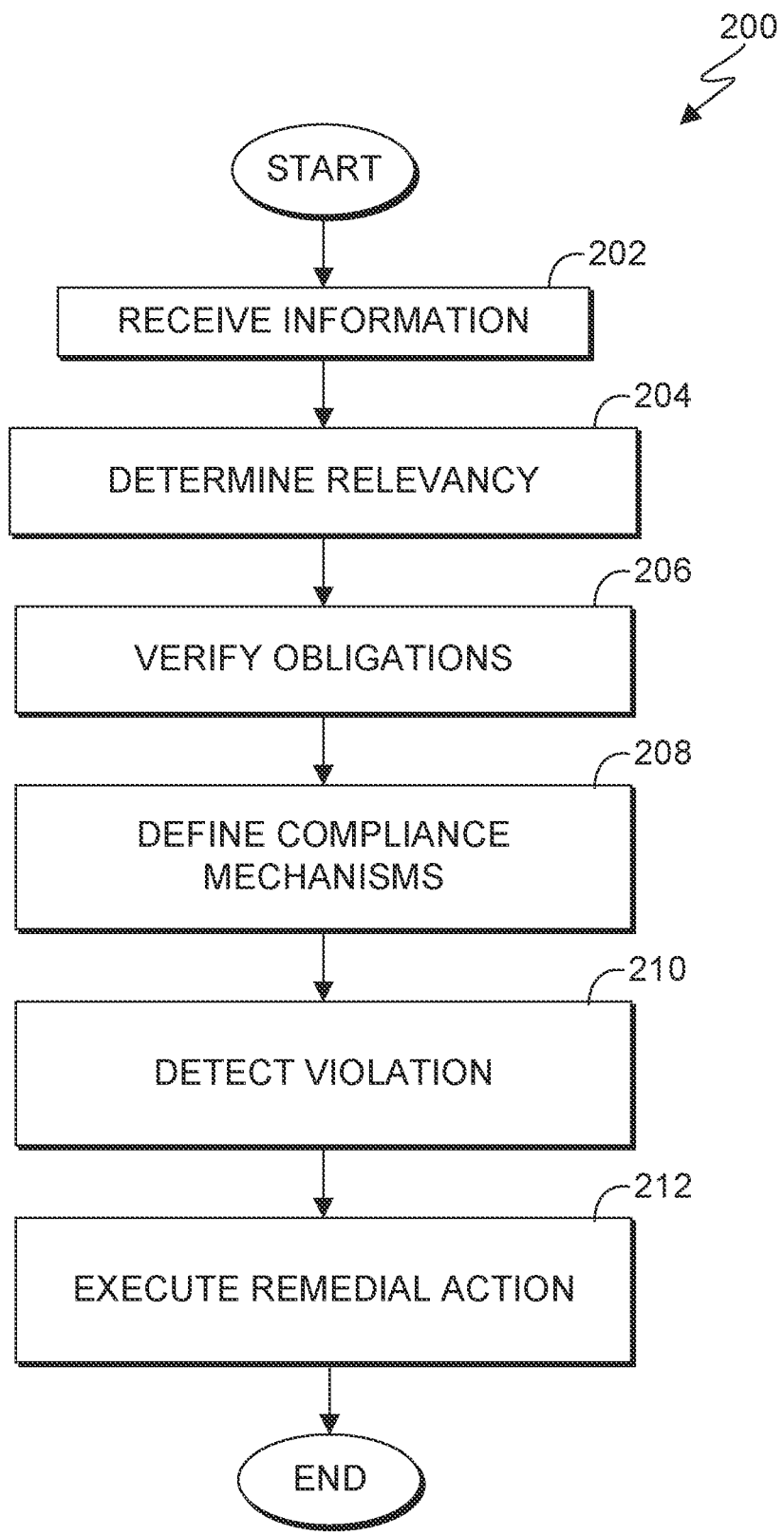
FIG. 2 is a flowchart depicting operational steps for executing a remedial action in response to determining a compliance violation, in accordance with an embodiment of the present invention.

FIG. 2 is a flowchart 200 depicting operational steps for executing a remedial action in response to determining a compliance violation, in accordance with an embodiment of the present invention.

In step 202, compliance manager 110 receives information. In this embodiment, compliance manager 110 receives a request from client computing device 102. In other embodiments, compliance manager 110 can receive information from one or more other components of computing environment 100.

Information received by compliance manager 110 refers to information pertaining to an activity. An activity may refer to one or more actions that a respective user or system performs. For example, an activity can refer to a performance of a task across one or more industries (e.g., computer processing tasks, service level agreements, etc.) In some instances, an activity can also include relevant information can refer to relevant regulatory documentation, registration document, and other regulatory requirements (e.g., statutory compliance, industry specific guidelines, consumer protection regulations, etc.). Examples of regulatory compliance can include traffic laws (e.g., trucks are not allowed from a certain road, heavy vehicles are not allowed during school hours, etc.), governing bodies (e.g., cranes are not allowed to be operated because of potential hazards, sidewalks need to be protected, cranes cannot operate in an open area, trucks cannot spill hazardous materials on the road, etc.), and construction (e.g., all workers must wear safety equipment, construction material should be covered to reduce dust and pollution, construction site safety and security, etc.). An activity can also include a description. A description can include location information of an area or an event. Location information can include one or more, textual, pictorial, audio, and video files associated with either a location or an event. Location information can also include hours of operation of a building, road closures, anticipated traffic based on scheduled events such as concerts, real-time traffic, etc.

In step 204, compliance manager 110 determines relevancy of identified clauses. In this embodiment, compliance manager 110 determines relevancy of identified clauses using a combination of one or more natural language processing techniques, one or more deep learning models, machine learning algorithms, and one or more artificial intelligence algorithms as discussed in greater detail with respect to FIG. 3.

In step 206, compliance manager 110 verifies obligations. In this embodiment, compliance manager 110 verifies obligations by compiling the relevant clauses into a single list and comparing it against one or more additional sources for regulatory compliance. In other embodiments, compliance manager 110 can verify obligations by transmitting the compiled relevant clauses with a subject matter expert. In response to compliance manager 110 receiving additional clauses from the subject matter expert, compliance manager 110 can update the compiled list and stored the compiled list as a list of verified obligations associated with a performance of the activity.

In step 208, compliance manager 110 defines compliance mechanisms for the relevant clauses. In this embodiment, compliance manager defines compliance mechanisms by identifying devices associated with performance of an activity. For example, where an activity specifies a requirement for specific water flow to be maintained, compliance manager 110 can identify one or more mechanisms to check whether the specified water flow is being satisfied. In some embodiments, compliance manager 110 can interface or otherwise directly receive real time or batched information from these one or more identified compliance mechanisms. In this embodiment, the identified devices can be localized to one area or distributed amongst several environments.

In step 210, compliance manager 110 can detect one or more violations of clauses determined to be relevant. In this embodiment, compliance manager 110 can detect one or more violations of clauses determined to be relevant by creating a digital twin of the activity and simulating one or more actions based on received sensor information. In this manner, compliance manager 110 can build a digital environment and subsequently simulate one or more actions to either detect a potential violation or simulate consequences of a violation.

In other embodiments, compliance manager 110 can build a digital twin of the activity and rune one or more simulations actions taken to accomplish the activity. In this manner, compliance manager 110 can generate one or more additional recommendations to satisfy requirements (i.e., obligations). In some circumstances, compliance manager 110 can then execute the generated recommendations (e.g., alter a route based on the time of day, current route conditions, regulatory requirements, etc.).

In yet other embodiments, compliance manager 110 can build a digital twin after detecting a violation. In this way, compliance manager 110 can identify other potential obligations and predict consequences of the violations. For example, with respect to a detected water leak, compliance manager 110 can simulate the leakage over a period of time to identify other potential systems that could be affected (e.g., water levels in a confined area after a period of time, electrical circuits that may be affected by water levels, leakage rates of certain materials, etc.).

In response to detecting either a potential violation or simulating an action and identifying consequences to the detected violation, compliance manager 110 can generate one or more recommendations to fix the detected violation. Compliance manager 110 can then order the one or more recommendations to fix based on user preference (e.g., sorting from easiest to hardest measured from an estimated time to fix). For example, in some embodiments, a generated recommendation would be to alter the route to avoid the potential violation (e.g., re-routing a delivery vehicle carrying food or food products away from an area having potential contaminants).

In step 212, compliance manager 110 can execute remedial action to prevent a violation of relevant clauses. In this embodiment, compliance manager 110 can execute a remedial action. For example, where a generated recommendation would be to alter the route to avoid the potential violation, compliance manager 110 can then transmit the altered route along with an explanation why the transit is being rerouted. In some instances, compliance manager 110 can determine that the remedial action is to notify one or more stakeholders and transmit an accompanying report that details the potential violate along with rationale as to why the condition is being violated. In instances where compliance mechanisms have been integrated within compliance manager 110, compliance manager can execute a remedial action. For example, where compliance manager 110 detects a flow condition (e.g., with a liquid) is not satisfied, compliance manager 110 can transmit instructions to the compliance mechanism and adjust positioning of a valve to redirect the flow until required conditions are satisfied.

Figure 3:
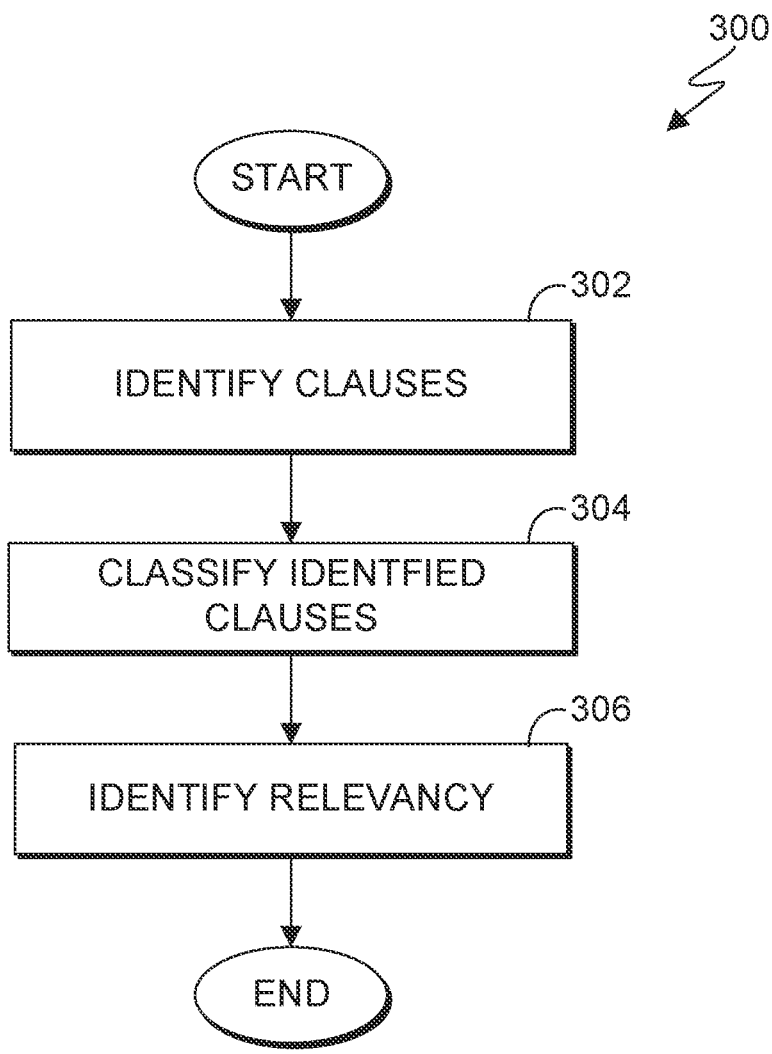
FIG. 3 is a flowchart for determining relevancy of identified clauses, in accordance with an embodiment of the present invention.

FIG. 3 is a flowchart 300 for determining relevancy of identified clauses, in accordance with an embodiment of the present invention.

In step 302, compliance manager 110 identifies clauses associated with an activity. In this embodiment, compliance manager 110 identifies clauses using one or more natural language processing and machine learning techniques (e.g., sentence splitting, tokenization, POS tagging, chunking, dependency parsing, and anaphora resolution, etc.) to process the semantics of the text. In some embodiments, compliance manager 110 can identify clauses associated with the activity using one or more machine learning algorithms.

In step 304, compliance manager 110 classifies the identified clauses. In this embodiment, compliance manager 110 classifies the identified clauses as operational requirements or nonoperational requirements. An operational requirement as used herein refers to the performance of one or more actions to satisfy a task (i.e., an activity). Conversely, a non-operational requirement refers to static requirements (e.g., building locations, operating hours, zoning requirements, etc.). In this embodiment, compliance manager 110 can classify the identified clauses through a combination of machine learning and artificial intelligence algorithms.

In step 306, compliance manager 110 determines relevancy of the identified clauses. In this embodiment, compliance manager 110 determines relevancy of the identified clauses using one or more deep learning algorithms. In some embodiments, compliance manager 110 can assign weighted values to respective clauses based on certain key words of the clauses matching regulatory requirements. In these embodiments, compliance manager 110 can determine clauses as relevant in response to the weighted value (e.g., assigned score) meeting or exceeding a threshold score for relevancy. In this embodiment, compliance manager 110 uses a numeric scale where lesser numbers indicate a lesser score and greater numbers indicate a higher score. For example, where the threshold score for relevance is fifty out of a numeric scale of zero to one hundred, compliance manager 110 can determine any clause scoring fifty or greater as being relevant.

Figure 4:
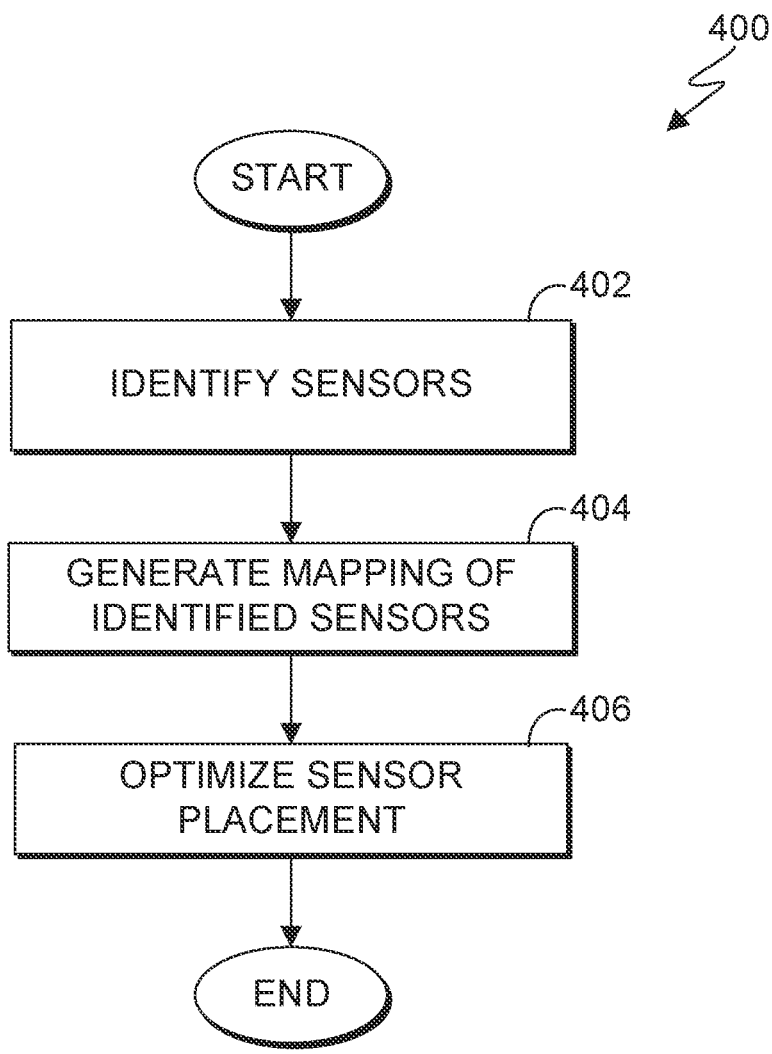
FIG. 4 is a flowchart for optimizing sensor placement, in accordance with an embodiment of the present invention.

FIG. 4 is a flowchart 400 for optimizing sensor placement, in accordance with an embodiment of the present invention.

In step 402, compliance manager 110 identifies sensors. In this embodiment, compliance manager identifies sensors by transmitting a request to IoT connected devices within an area to send and register respective UUIDs. For example, compliance manager 110 can request IoT devices (e.g., smart phones) to connect the devices. Compliance manager 110 can then map an environment based on received information. In this embodiment, compliance manager 110 maps an environment by identifying one or more connected devices and their respective locations and capabilities. In this embodiment, compliance manager 110 can collect information streams from various data sources (e.g., IoT connected devices, etc.) that are capable of displaying and inputting information to the environment.

In this embodiment, compliance manager 110 can collect additional information from one or more other services by invoking an in-bound API which then initiates a MAC based trajectory path request for all the devices in the area. In this embodiment, an in-bound approach of communication includes control framed of MAC (Media Access Control) protocol and compliance manager 110 invokes an in-bound API across the common external data collector service in 5G domain wherein the static platform data can be accessed. In this way, compliance manager 110 can collect static data that includes platform identification, hardware specification and model internal architecture is collected from the MAC based service interconnect manager. Examples of static data can include hardware default settings. Compliance manager 110 can then parse the collected information using a regex-based document classifier and saved in metadata mappers.

In this embodiment, compliance manager 110 can then optimize placement of each of the identified sensors (e.g., devices). In this embodiment, compliance manager 110 can optimize placement of each identified sensor using an audio-spatial optimization algorithm such that the mechanism needing to be monitored can have at least one monitoring sensor. In certain embodiments, compliance manager 110 can recommend alternative placements or recommend more than one sensor placement to allow multiple facets of a mechanism to be monitored. For example, where an activity requires a constant flow of liquid to be carried throughout a cylinder (e.g., a pipe), compliance manager 110 can recommend sensor placement at each end of the cylinder to measure directional flow (e.g., both input and output). In certain circumstances, compliance manager 110 can recommend additional placement of sensors throughout the cylinder. Depending on relevant clauses, compliance manager 110 can also recommend moisture leakage detection sensors that can measure the rate of moisture leaking and determine whether leakage rates are within acceptable parameters (i.e., relevant clauses).

In step 404, compliance manager 110 generates a mapping of identified sensors. In this embodiment, compliance manager 110 generates a mapping of the identified sensors based on the received information (e.g., relevant clauses) registration information from step 402. In this embodiment, compliance manager 110 can generate the mapping of identified sensors in response to confirming sensor placement and verifying whether additional sensors were added based on compliance manager 110's optimization recommendations.

In step 406, compliance manager 110 optimizes sensor placement for an activity. In this embodiment, compliance manager 110 optimizes sensor placement for a second time after deployment. In this embodiment, compliance manager 110 optimizes sensor placement for an activity to monitor one or more values or readings that affect compliance and affect wear components of the sensor. For example, where compliance manager 110 detects that a sensor measuring gas levels, though water resistant is continually experiencing conditions that subject it to water, compliance manager 110 can suggest alternate locations for the sensor to increase the longevity of the sensor.

Figure 5:
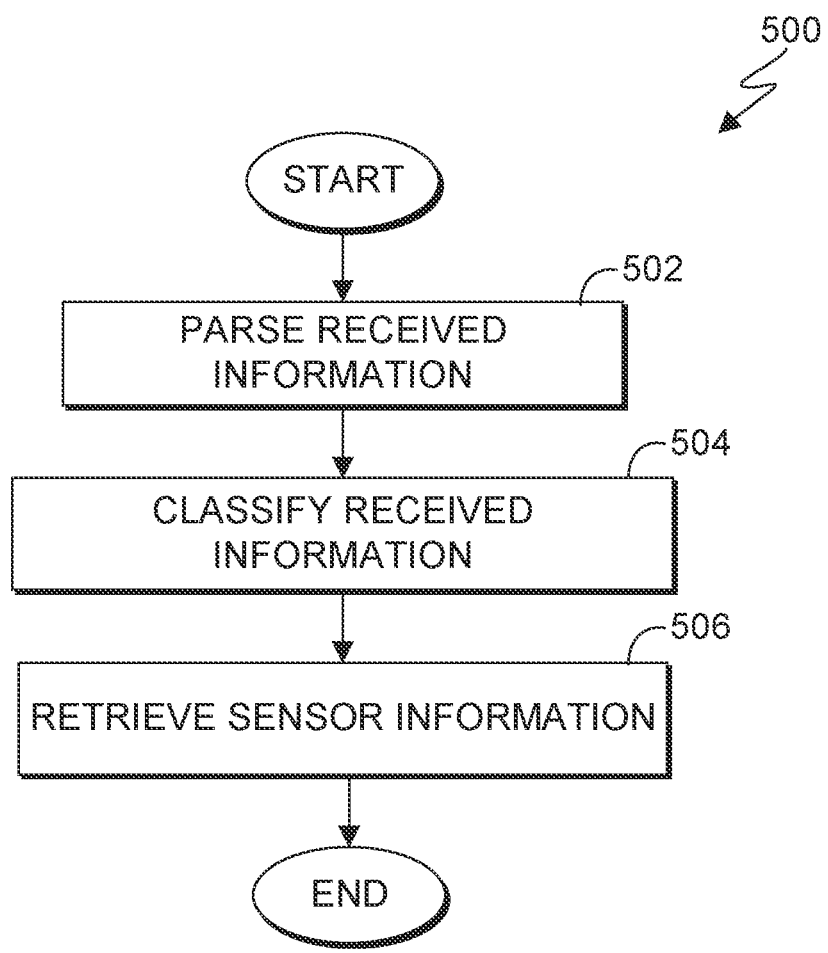
FIG. 5 is a flowchart for detecting a violation, in accordance with an embodiment of the present invention.

FIG. 5 is a flowchart 500 for detecting a violation, in accordance with an embodiment of the present invention.

In step 502, compliance manager 110 parses received information. In this embodiment, compliance manager parses the received information using natural language processing techniques. In certain embodiments, compliance manager 110 can organized the received information (e.g., sensor readings) into a single chart organized based on relevant clause.

In step 504, compliance manager 110 classifies received information. In this embodiment, compliance manager 110 classifies received information according to an associated action being performed using one or more machine learning techniques. In other embodiments, compliance manager 110 can then classify, that is, correlate the received information to an action being formed and subsequently compare the received information (e.g., sensor reading) against the relevant clauses to determine if the values collected satisfy the relevant clauses.

In step 506, compliance manager 110 retrieves sensor information. In this embodiment, compliance manager 110 iteratively retrieves sensor information to confirm current readings. Compliance manager 110 can use the confirmed readings to detect a violation by comparing the values and determining that the values either match (e.g., conditions are satisfied) or do not match (e.g., conditions are not satisfied). In this embodiment, compliance manager 110 can then build a digital twin to simulate consequences of a detected violation.

In embodiments, where compliance manager 110 has built a digital twin to simulate conditions, compliance manager 110 can compare the simulated conditions and values received from the digital twin against the currently received sensor information to confirm the accuracy of the digital twin and to identify one or more potential causes for the readings of the digital twin simulation to not be within acceptable output values.

Figure 6:
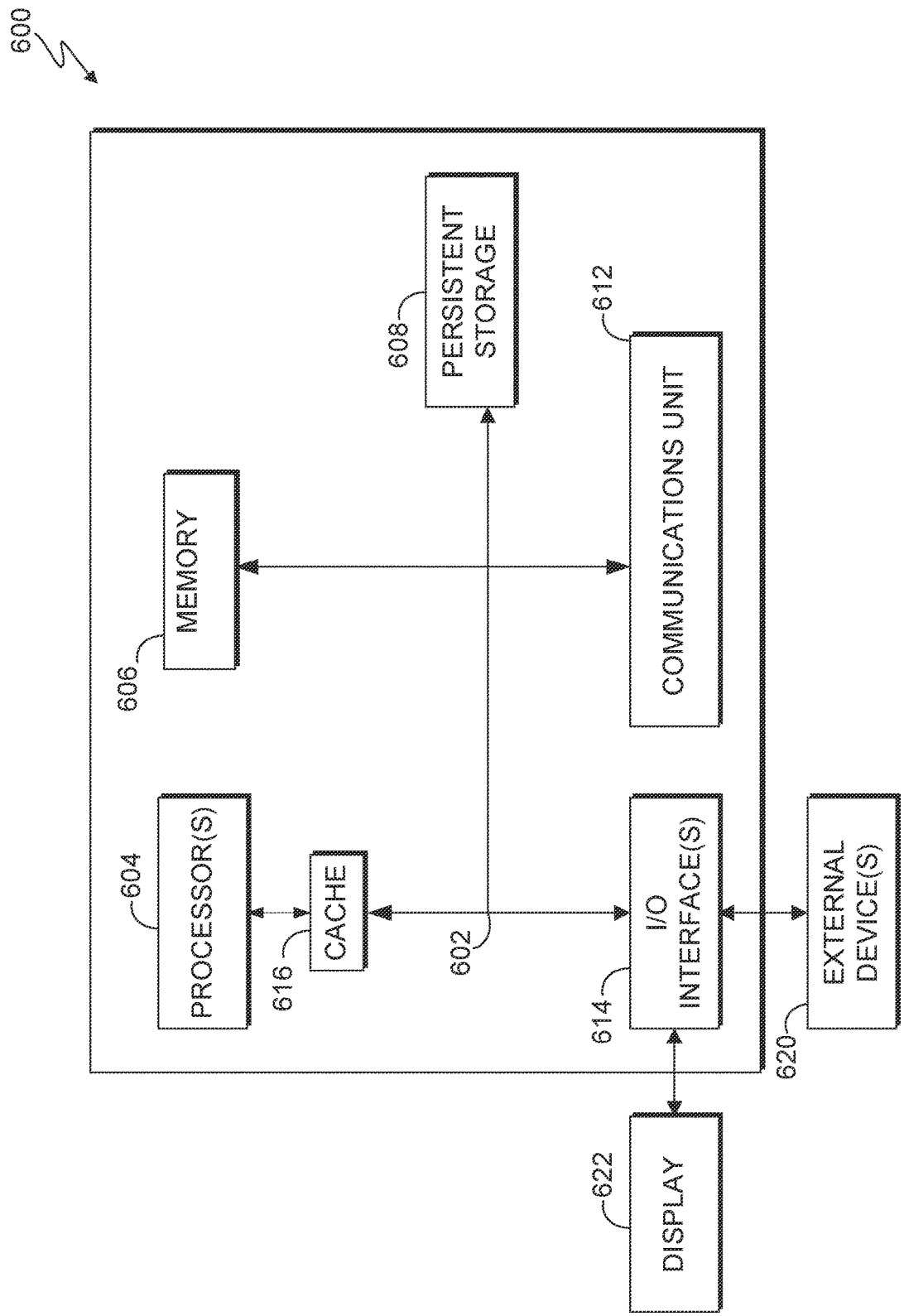
FIG. 6 is a block diagram of an example system, in accordance with an embodiment of the present invention.

FIG. 6 depicts a block diagram of components of computing systems within computing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 600 includes communications fabric 602, which provides communications between cache 616, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Compliance manager 110 (not shown) may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. Compliance manager 110 may be downloaded to persistent storage 608 through communications unit 612.

I/O interface(s) 614 allows for input and output of data with other devices that may be connected to client computing device and/or server computer. For example, I/O interface 614 may provide a connection to external devices 620 such as a keyboard, keypad, a touch screen, and/or some other suitable input device. External devices 620 can also include portable computer readable storage media such as, for example, thumb drives, portable optical or magnetic disks, and memory cards. Software and data used to practice embodiments of the present invention, e.g., compliance manager 110, can be stored on such portable computer readable storage media and can be loaded onto persistent storage 608 via I/O interface(s) 614. I/O interface(s) 614 also connect to a display 622.

Display 622 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
in response to receiving information associated with an activity, identifying requirements associated with performance of the activity;
determining relevancy of each requirement of the identified requirements;
classifying the identified requirements as operation requirements or nonoperation requirements;
defining compliance mechanisms needed to verify compliance of the identified requirements that were determined relevant;
mapping an environment by identifying one or more connected devices and their respective locations and capabilities;
optimizing sensor placement for an activity to monitor readings that affect compliance and affect wear components of the sensor;
detecting a violation by comparing the readings and determining when the readings indicate the identified requirements are satisfied, or when the readings indicate the identified requirements are not satisfied;
comparing simulated conditions of the identified requirements and readings received from a digital twin against received sensor data to confirm accuracy of the digital twin and to identify one or more potential causes for the readings of the simulated conditions of the digital twin to not be within acceptable output values; and
in response to detecting a violation, executing one or more remedial actions to satisfy an identified requirement that was determined relevant to the identified requirements;
wherein detecting a violation of an identified requirement of the identified requirements that were determined relevant comprises:
generating the digital twin of the activity and associated environment;
simulating an action based on the received sensor data;
determining that the simulated action will cause a violation; and
generating one or more recommendations to prevent the action that will cause the violation from occurring.

2. The computer-implemented method of claim 1, further comprising:

simulating consequences of performance of the action; and identifying one or more of the simulated consequences of the performance of the action will cause a violation.

3. The computer-implemented method of claim 1, further comprising:

identifying a comprehensive list of actions needed to satisfy one or more requirements associated with the performance of the activity.

4. The computer-implemented method of claim 1, further comprising:

identifying one or more sensors required to ensure compliance of the identified requirements.

5. The computer-implemented method of claim 4, further comprising:

optimizing placement of each of the one or more identified sensors required to ensure compliance of the identified requirements.

6. A computer program product comprising:

one or more computer readable storage media and program instructions stored on the one or more computer readable storage media, the program instructions comprising:

program instructions to, in response to receiving information associated with an activity, identify requirements associated with performance of the activity;

program instructions to determine relevancy of each requirement of the identified requirements;

program instructions to classify the identified requirements as operation requirements or nonoperation requirements;

program instructions to define compliance mechanisms needed to verify compliance of the identified requirements that were determined relevant;

program instructions to map an environment by identifying one or more connected devices and their respective locations and capabilities;

program instructions to optimize sensor placement for an activity to monitor readings that affect compliance and affect wear components of the sensor;

program instructions to detect a violation by comparing the readings and determining when the readings indicate the identified requirements are satisfied, or when the readings indicate the identified requirements are not satisfied;

program instructions to compare simulated conditions of the identified requirements and readings received from a digital twin against received sensor data to confirm accuracy of the digital twin and to identify one or more potential causes for the readings of the simulated conditions of the digital twin to not be within acceptable output values; and program instructions to, in response to detecting a violation, execute one or more remedial actions to satisfy an identified requirement that was determined relevant to the identified requirements;

wherein the program instructions to detect a violation of an identified requirement of the identified requirements that were determined relevant comprise:

program instructions to generate the digital twin of the activity and associated environment;

program instructions to simulate an action based on the received sensor data;

program instructions to determine that the simulated action will cause a violation; and program instructions to generate one or more recommendations to prevent the action that will cause the violation from occurring.

7. The computer program product of claim 6, wherein the program instructions stored on the one or more computer readable storage media further comprise:

program instructions to simulate consequences of performance of the action; and program instructions to identify one or more of the simulated consequences of the performance of the action will cause a violation.

8. The computer program product of claim 6, wherein the program instructions stored on the one or more computer readable storage media further comprise:

program instructions to identify a comprehensive list of actions needed to satisfy one or more requirements associated with the performance of the activity.

9. The computer program product of claim 6, wherein the program instructions stored on the one or more computer readable storage media further comprise:

program instructions to identify one or more sensors required to ensure compliance of the identified requirements.

10. The computer program product of claim 9, wherein the program instructions stored on the one or more computer readable storage media further comprise:

program instructions to optimize placement of each of the one or more identified sensors required to ensure compliance of the identified requirements.

11. A computer system comprising:

one or more computer processors;

one or more computer readable storage media; and program instructions stored on the one or more computer readable storage media for execution by at least one of the one or more computer processors, the program instructions comprising:

program instructions to, in response to receiving information associated with an activity, identify requirements associated with performance of the activity;

program instructions to determine relevancy of each requirement of the identified requirements;

program instructions to classify the identified requirements as operation requirements or nonoperation requirements;

program instructions to define compliance mechanisms needed to verify compliance of the identified requirements that were determined relevant;

program instructions to map an environment by identifying one or more connected devices and their respective locations and capabilities;

program instructions to optimize sensor placement for an activity to monitor readings that affect compliance and affect wear components of the sensor;

program instructions to detect a violation by comparing the readings and determining when the readings indicate the identified requirements are satisfied, or when the readings indicate the identified requirements are not satisfied;

program instructions to compare simulated conditions of the identified requirements and readings received from a digital twin against received sensor data to confirm accuracy of the digital twin and to identify one or more potential causes for the readings of the simulated conditions of the digital twin to not be within acceptable output values; and program instructions to, in response to detecting a violation, execute one or more remedial actions to satisfy an identified requirement that was determined relevant to the identified requirements;

wherein the program instructions to detect a violation of an identified requirement of the identified requirements that were determined relevant comprise:

program instructions to generate the digital twin of the activity and associated environment;

program instructions to simulate an action based on the received sensor data;

program instructions to determine that the simulated action will cause a violation; and program instructions to generate one or more recommendations to prevent the action that will cause the violation from occurring.

12. The computer system of claim 11, wherein the program instructions stored on the one or more computer readable storage media further comprise:

program instructions to simulate consequences of performance of the action; and program instructions to identify one or more of the simulated consequences of the performance of the action will cause a violation.

13. The computer system of claim 11, wherein the program instructions stored on the one or more computer readable storage media further comprise:

program instructions to identify a comprehensive list of actions needed to satisfy one or more requirements associated with the performance of the activity.

14. The computer system of claim 11, wherein the program instructions stored on the one or more computer readable storage media further comprise:

program instructions to identify one or more sensors required to ensure compliance of the identified requirements.

* * * * *